Oct. 25, 1960 H. PH. G. A. R. VON ZBOROWSKI 2,957,416

FLYING MISSILES

Original Filed April 14, 1952

3 Sheets-Sheet 1

INVENTOR

HELMUT Ph G.A.R. VON ZBOROWSKI

BY

Bailey, Stephens & Huettig

ATTORNEYS

FLYING MISSILES

Original Filed April 14, 1952

3 Sheets-Sheet 2

INVENTOR
HELMUT Ph. G.A.R. VON ZBOROWSKI
BY
Bailey, Stephens & Huettig
ATTORNEYS INVENTOR
HELMUT Ph. G.A.R. VON ZBOROWSK.
BY
Bailey, Stephens & Huettig
ATTORNEY United States Patent Office 2,957,416

Patented Oct. 25, 1960

2,957,416

FLYING MISSILES

Helmut Ph. G. A. R. von Zborowski, Chateau de Boussy St.-Antoine par Brunoy, France Original application Apr. 14, 1952, Ser. No. 282,107. Divided and this application July 13, 1956, Ser. No. 597,714

Claims priority, application France Apr. 25, 1951

2 Claims. (Cl. 102—50)

The present invention relates to flying missiles comprising a body the surface of which is one of revolution about the longitudinal axis of symmetry of the missile, this surface constituting substantially the whole lift producing surface of the missile.

The object of my invention is to provide a missile of this kind which is better adapted to meet the requirements of practice than those known up to this time, in particular concerning the stability and range of its trajectory.

For this purpose, according to my invention, I provide such a missile with a trimming spoiler projecting from a surface of the missile in a plane transverse to the longitudinal axis thereof, the center of area of the projecting portion of the spoiler being eccentric with respect to said longitudinal axis, said spoiler being mounted to turn about said longitudinal axis, and pendulum means are operatively connected to the spoiler to maintain its center of area in a predetermined radial position in space with respect to said longitudinal axis, such position being chosen to give the missile a positive angle of incidence.

It should be well understood that, in the following description and claims, the term "spoiler" designates an aerodynamic control device capable, when projecting from an aerodynamic surface, of changing the airflow along said surface with respect to what it would be if said spoiler did not project therefrom, with the object of controlling the angle of incidence of said surface with respect to its trajectory.

Preferred embodiments of my invention will be hereinafter described with reference to the accompanying drawings, given merely by way of example, and in which.

Figure 15:
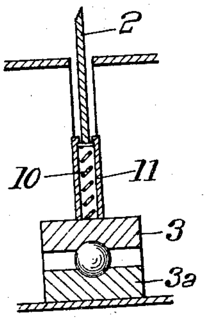
Figure 16:
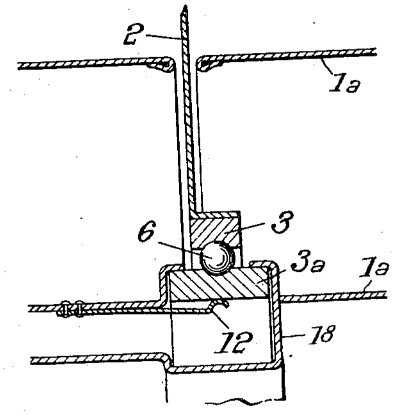
Figure 17:
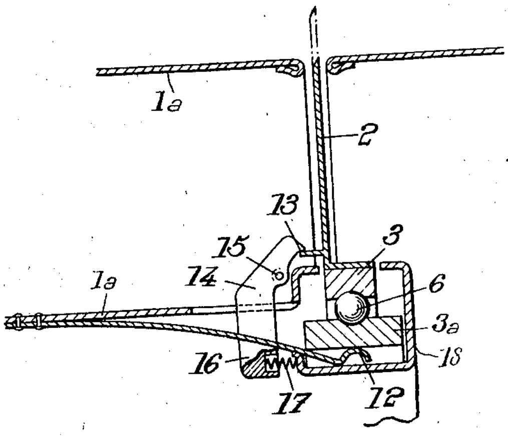

Figs. 11 to 14 inclusive show four different constructions of rotary missiles provided with control means according to my invention;

Figs. 15, 16 and 17 are partial sectional views of three different retractable control means according to my invention.

Figure 2:
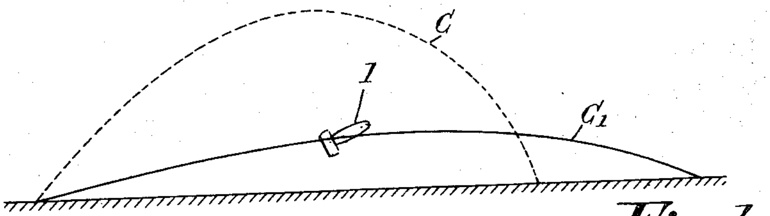
Fig. 2 illustrates the path of travel of such a missile.

It is known that one way of increasing the range of a flying missile, either self-propelled or not, the theoretical trajectory of which is shown by curve C in Fig. 2, consists in giving the lift producing surface of the missile a positive incidence with respect to its trajectory by means of suitable trimming means, the true trajectory of such a missile, for the same initial velocity, being then shown by curve $C_1$ which is flatter and gives a longer range than curve C.

On the other hand, it is advantageous to make use of missiles rotating about their longitudinal axis of symmetry because the deflections from the desired path of travel of the missile which are due to unavoidable imperfections in the symmetry of the missile take place alternately in one direction and the opposite one in the course of the rotation of said missile and therefore balance one another.

But it will be readily understood that when the missile is caused to rotate about its longitudinal axis, or is allowed to rotate freely about this axis, it becomes very difficult to give a positive lift angle to its aerodynamic system. Conventional trimmings as above referred to can no longer be used because, in the course of the rotation of the missile, they would pass through positions where, instead of imparting the desired positive lift angle to the aerodynamic system of the missile, they would contribute in deviating said missile from its desired path.

The object of the present invention is to overcome this difficulty.

Figure 1:
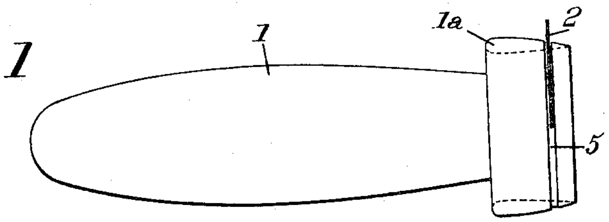
Fig. 1 is a diagrammatic elevational view of a rotary flying missible provided with a trimming spoiler according to my invention.

In the construction of Fig. 1, the flying missile essentially includes a body 1 and a coaxial tail annular wing 1*a* constituting the only lift producing surfaces of the missile. The desired position angle of incidence is given to the missile by a spoiler 2, which acts by modifying the flow of air along the annular wing.

Figure 3:
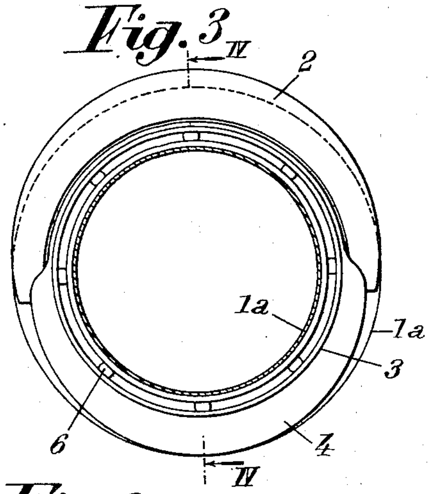
Figs. 3 and 4 are respectively a front view and a sectional view on the line IV—IV of Fig. 3 of the spoiler mounting means of the missile illustrated by Fig. 1.
Figure 4:
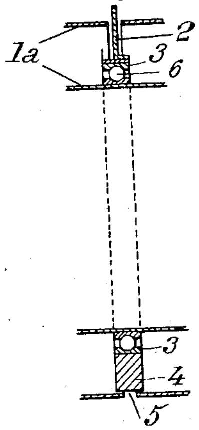

According to my invention, as illustrated in detail by Figs. 3 and 4, this spoiler 2 is carried by a piece 3 rotatable with respect to annular wing 1*a* about the axis thereof, whereby the axis of symmetry of spoiler 2 (and therefore the radial plane in which is located the aerodynamic reaction it produces) can assume any position about the longitudinal axis of the missile. This piece 3 is provided with a counterweight 4, so as to form a pendulum pivoted on wing 1*a* about the axis thereof. Wing 1*a* is provided with an annular slot 5 to accommodate spoiler 2.

With such an arrangement, spoiler 2 will remain suitably disposed to give annular wing 1*a* the desired positive angle of incidence despite rotation thereof about its longitudinal axis.

Preferably, an anti-friction bearing 6, for instance a ball bearing, is provided between rotatable member 3 and wing structure 1*a*, in order to eliminate any risk of said rotatable member being driven in the rotation movement of wing structure 1*a*.

In the construction of Fig. 1, spoiler 2 projects from the wing structure outwardly at the upper part thereof and near the trailing edge thereof.

Figure 5:
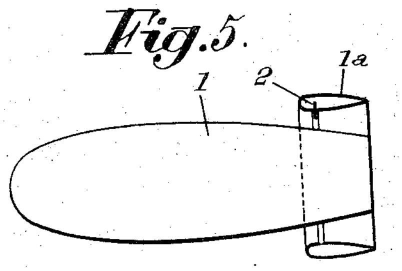
Fig. 5 shows a modification of the missile of Fig. 1.

Fig. 5 shows another construction in which spoiler 2 projects from the wing structure inwardly at the upper part thereof and near the leading edge.

Figure 6:
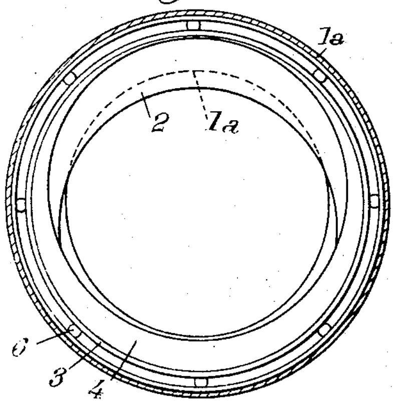
Fig. 6 is a front view corresponding to Fig. 5.

In this case, advantageously, as shown by Fig. 6, ball bearing 6 is interposed between rotatable piece 3 and the outer wall of wing 1*a*, whereas, in the construction of Figs. 3 and 4, ball bearing 6 is interposed between rotatable piece 3 and the inner wall of wing 1*a*.

Figure 7:
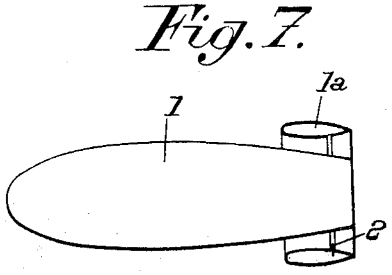

In the construction of Fig. 7, spoiler 2 projects inwardly from the lower portion of annular wing 1*a* and is located close to the trailing edge of said wing.

Figure 8:
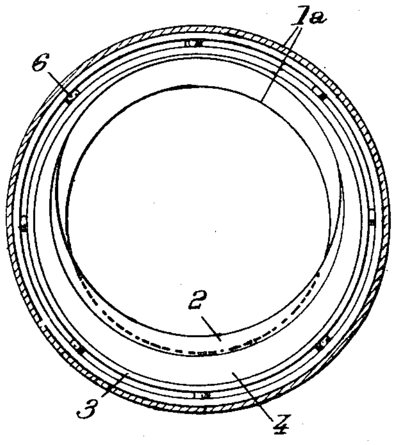
Figs. 7 and 8 are views similar to those of Figs. 5 and 6, relating to another modification.

Fig. 8 shows the respective elements of the arrangement of Fig. 7. The ball bearing 6 is interposed between piece 3 and the outer wall of annular wing 1*a*. Spoiler 2 and counterweight 4 are, in this construction, located on the same side of the axis of the annular wing, while, in the above described constructions, they were diametrally opposed.

Figure 9:
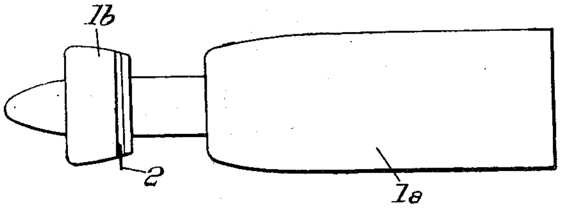
Figs. 9 and 10 are, respectively, an elevational view of a rotary missile provided with control means of another type but still according to my invention and a front view of said control means.
Figure 10:
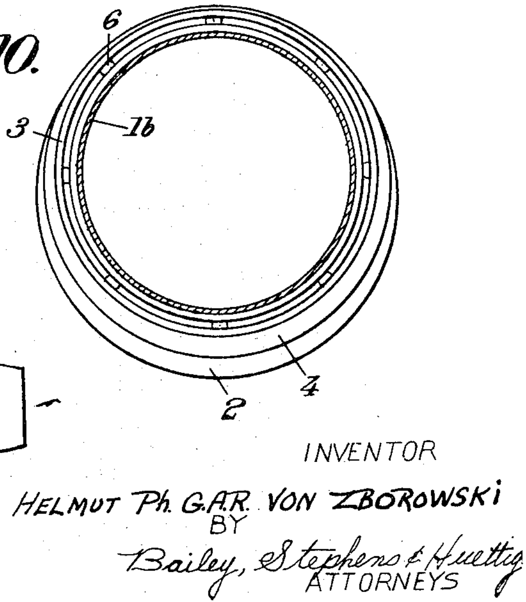
Figure 11:
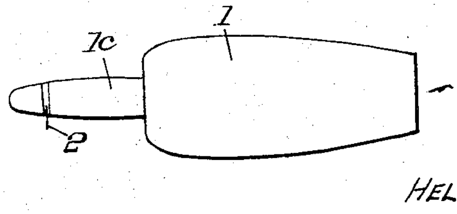

Figs. 9 to 11 show how the invention may be applied to flying missiles in which the spoilers are located ahead of the main annular wing.

In the construction of Fig. 9, the missile is provided, at the front thereof, with an auxiliary annular wing 1b and spoiler 2 projects outwardly, at the lower part thereof and near its trailing edge.

In the construction of Fig. 11, spoiler 2 is mounted on a streamlined part 1c extending ahead of annular wing 1a.

In both of these cases (Figs. 9 and 11), the rotating piece 3 which supports the spoiler is, for instance, arranged as shown by Fig. 10, spoiler 2 and counterweight 4 being located both on the same side of the longitudinal axis of the missile.

The missiles shown up to now included aerofoil sections corresponding to subsonic velocities.

Figure 12:
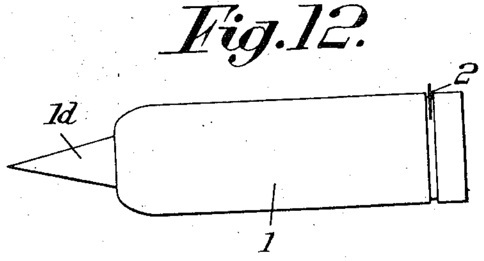
Figure 13:
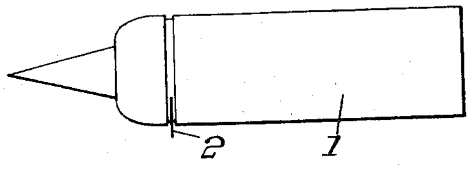
Figure 14:
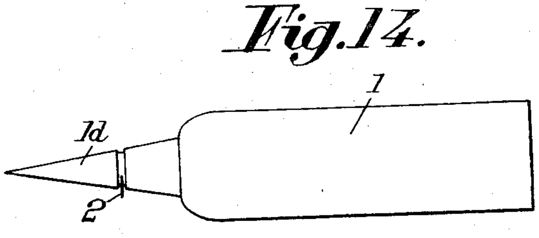

Figs. 12 to 14 show constructions of a rotary flying missile 1 in which the air speed velocity is supersonic, this missile including, at the front thereof, a pointed portion 1d.

In the construction of Fig. 12, spoiler 2 is mounted at the rear and at the upper part of the body 1 of the missile. In the construction of Fig. 13, it is mounted at the front and at the lower part of body 1. In the construction of Fig. 14, it is mounted at the lower part of the pointed portion 1d.

In all the embodiments of my invention above described, the spoiler means constantly project from the surface of the wing structure. Now, this is inconvenient in practice because said means may be deteriorated during transportation, storing and launching of the missile.

According to a feature of my invention, said spoilers are made retractable.

For instance, the spoiler may be mounted retractable, as shown by Fig. 15, the base thereof being guided between two plates 11 carried by rotatable piece 3, and a spring 10 urging said spoiler outwardly.

According to another construction, illustrated by Fig. 16, which corresponds to a construction as shown by Fig. 4, the whole of rotatable piece 3 and the bearing 3a on which it is mounted (i.e. the inner race of ball bearing 6) can be moved with respect to wing structure 1a so as to retract spoiler 2 inside this wing structure. For this purpose, this inner race 3a is slidable transversely in a guide ring 18 rigid with wing structure 1a. Springs 12 urge this ball bearing inner race 3a toward coaxial position with respect to annular wing structure 1a, where spoiler 2 projects from said wing structure. To retract this spoiler, it suffices to push the whole of parts 2–3–3a downwardly against the action of springs 12.

Advantageously, means are provided for temporarily holding spoiler 2 in retracted position, said means being preferably adapted to release said spoiler, so that it returns into active position, in response to the effect of the acceleration imparted to the missile when it is launched.

Such means are shown by Fig. 17, which illustrates a construction analogous to that above described with reference to Fig. 16. They include a lever 14 pivoted at 15 to the wing structure 1a and the hooked end 13 of which engages a projection of spoiler 2 to keep it in retracted position. A spring 17 tends to keep lever 14 in the spoiler holding position shown by the drawing. A weight 16 is provided at the lower end of lever 14 so that, under the effect of the launching acceleration imparted to the missile, this weight lags behind by inertia and disengages hook 13 from spoiler 2, thus enabling spring 12 to return part 3a into coaxial relation with the annular wing, thus moving spoiler 2 to the outside.

Such a holding device might be used with the construction of Fig. 17.

In the above description, my invention has been more especially described as applied to rotating flying missiles having an annular wing. However it is applicable to all kinds of flying missiles, for instance to rockets, even provided with a stabilizing tail unit, having propelling means which act for only a portion of their trajectory, and also to projectiles sent from a gun or the like and which may be self-propelled along a portion of their trajectory.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

The present application is a division of my U.S. patent application Ser. No. 282,107, filed April 14, 1952, now abandoned.

What I claim is:

1. A flying missile which comprises, in combination, a body the surface of which is one of revolution about a longitudinal axis of symmetry, this surface constituting substantially the whole lift producing surface of the missile, a single trimming spoiler device projecting from a surface of the missile in a plane transverse to said longitudinal axis, the center of area of the projecting portion of said spoiler device being eccentric with respect to said longitudinal axis and at a constant distance therefrom, the area of said projecting portion being constant, means mounting said spoiler device to turn freely with respect to said body about said longitudinal axis through 360°, and gravity pendulum means offset from said longitudinal axis operatively connected to said spoiler device and rotatable about said longitudinal axis to maintain the center of area of said spoiler device in a predetermined radial position in space with respect to said longitudinal axis, such position being chosen to give the missile a positive angle of incidence.

2. A flying missile which comprises, in combination, a body the surface of which is one of revolution about a longitudinal axis of symmetry, this surface constituting substantially the whole lift producing surface of the missile, a ring mounted in said body in a plane transverse to said longitudinal axis to turn freely with respect to said body about said axis through 360°, a single trimming spoiler carried by said ring projecting from a surface of the missile in a plane transverse to said longitudinal axis and at a constant distance therefrom, the area of said projecting portion being constant, the center of area of the projecting portion of said spoiler being eccentric with respect to said longitudinal axis, and gravity pendulum means offset from said longitudinal axis carried by said ring and rotatable therewith about said longitudinal axis to position the center of area of said spoiler device in a predetermined radial position in space with respect to said longitudinal axis, such position being chosen to give the missile a positive angle of incidence.

References Cited in the file of this patent

UNITED STATES PATENTS

| | | |
|---|---|---|
| 1,043,074 | Davis | Nov. 5, 1912 |
| 1,166,879 | Alord | Jan. 4, 1916 |
| 1,300,708 | Edison | Apr. 15, 1919 |
| 1,940,387 | Boykow | Dec. 19, 1933 |
| 2,402,718 | Albree | June 25, 1946 |
| 2,520,433 | Robinson | Aug. 29, 1950 |
| 2,584,826 | Wyckoff | Feb. 5, 1952 |

FOREIGN PATENTS

| | | |
|---|---|---|
| 797,933 | France | Feb. 24, 1936 |